United States Patent [19]

Minick et al.

[11] Patent Number: 4,629,648
[45] Date of Patent: Dec. 16, 1986

[54] EXTRUDED CAULK STRIP

[75] Inventors: Chris A. Minick, Stillwater; Gerald E. Mueller, Minneapolis, both of Minn.

[73] Assignee: Minnesota Mining and Manufacturing Co., St. Paul, Minn.

[21] Appl. No.: 782,359

[22] Filed: Oct. 1, 1985

[51] Int. Cl.[4] .......................... B32B 25/08; B32B 31/30
[52] U.S. Cl. .................. 428/189; 156/244.11; 156/325; 264/116 R; 264/176.1; 427/208.4; 428/343; 428/355
[58] Field of Search .............. 428/343, 355, 356, 174; 156/244.11, 338, 325; 264/176 R; 427/208.4

[56] References Cited

U.S. PATENT DOCUMENTS

| | | | |
|---|---|---|---|
| 2,454,821 | 11/1948 | McKee | 427/286 |
| 3,332,055 | 7/1967 | Bogner | 428/355 |
| 3,556,926 | 1/1971 | Rundle | 161/165 |
| 4,460,646 | 7/1984 | Inoue et al. | 428/355 |
| 4,536,445 | 8/1985 | Toy | 428/355 |

OTHER PUBLICATIONS

"Press-N-Sell," product literature page.

*Primary Examiner*—Paul J. Thibodeau
*Attorney, Agent, or Firm*—Donald M. Sell; James A. Smith; Richard Francis

[57] ABSTRACT

The invention provides an extruded caulk strip comprising a shaped caulk body in melt fusion contact with one major surface of a protective strip formed of substantially amorphous, non-tacky, conformable, thermoplastic, film-forming polymeric material. The extruded caulk strip is formed by melt extruding the thermoplastic film-forming polymeric material to form a continuous plastic strip, melt extruding a caulk mass to form a shaped caulk body, and contacting one of the major surfaces of the strip with the shaped caulk body while the contacting surfaces of the strip and the caulk body are in a plastic state capable of self fusion on contact.

11 Claims, 7 Drawing Figures

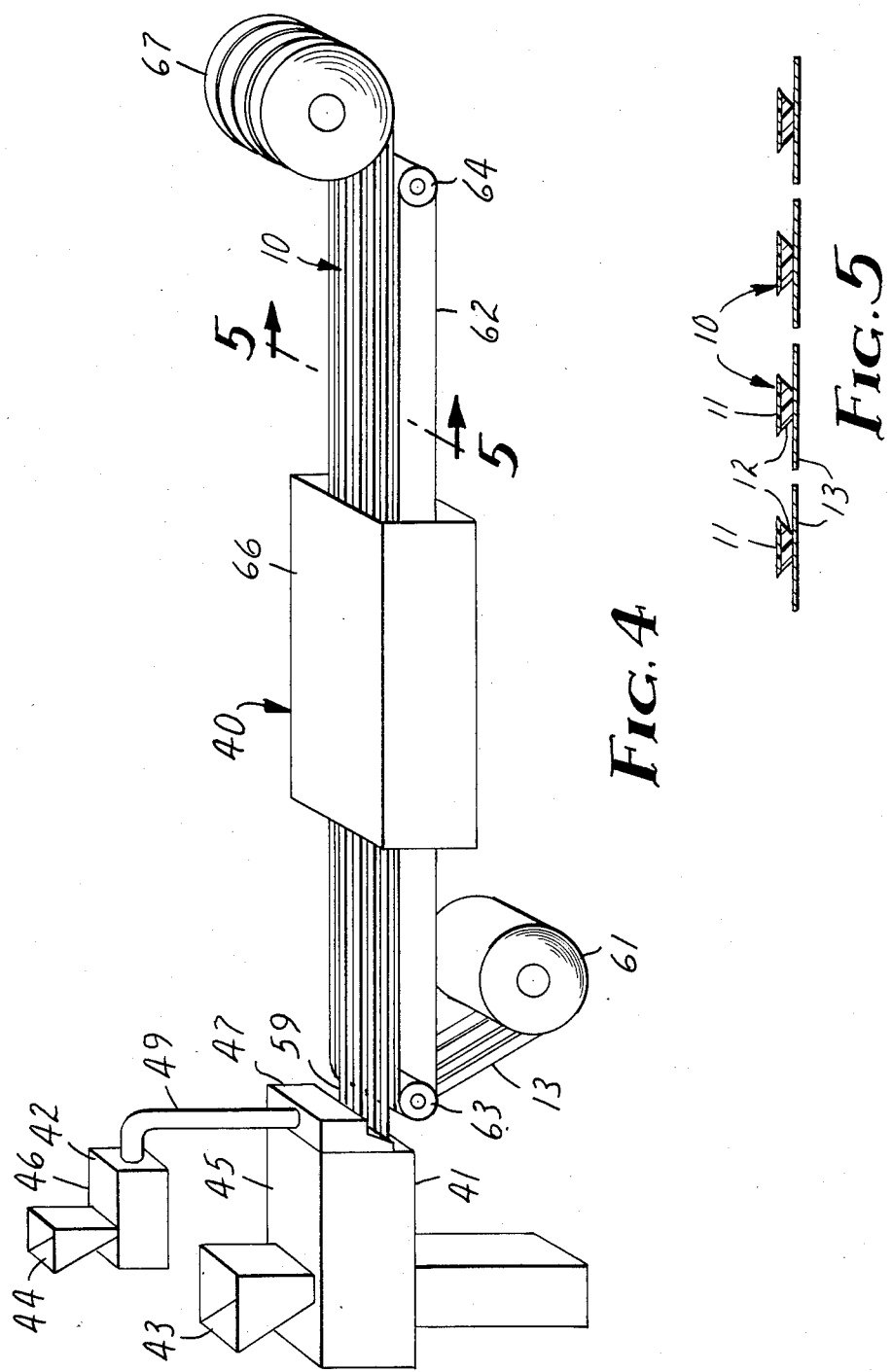

EXTRUDED CAULK STRIP

DESCRIPTION

1. Technical Field

The present invention relates to a pre-formed caulk strip and to a method of making the same by utilizing an extrusion process.

2. Background of the Invention

Caulking has been used in the building trades for both utilitarian and aesthetic reasons to cover open spaces, gaps or cracks between or within various structural members. Caulking is often used between metal panels, over expansion joints, around perimeters of door frames and window frames, between adjacent concrete slabs, and between a concrete slab and a foundation.

The use of caulking material as a sealant around a sink, bath tub or shower stall and its adjacent structural elements such as a wall or floor (which may be covered with ceramic or plastic tile) has been known for some time. Such caulking materials are used to prevent infiltration of water and water borne salts into cracks and to otherwise seal the cracks to prevent water damage and provide a more aesthetic appearance. Without a proper seal, water generally seeps into the crack, typically under the influence of capillary action, penetrates the underlying structure such as plaster, sheet rock, or wood, thereby causing crumbling of plaster or sheet rock, rotting, mildewing or molding of wood, and staining of adjacent surfaces such as the wall or ceiling below. This necessitates expensive repairs.

The composition of caulking materials varies considerably. For the most part, caulking material has a rubber base which is plasticized, filled and tackified to provide a deformable plastic mass which generally has immediate adhesion for the surfaces upon which it is applied. Some caulks will cure to a non-tacky state while others retain their applied physical properties. The curing time for certain curable caulking materials to achieve a tack-free surface is often long, causing an accumulation of dust particles on its surface, which can result in an unsightly appearance.

Caulking materials are typically applied in a variety of ways. Some caulking materials come in a cartridge which is placed into a caulking gun which forces the caulking material out of a small opening, about the diameter of a pencil, for deposit on the crack or seam. Other caulking materials are available in a putty-like composition for application by an appropriate tool. Still others are available in elongate strips which can merely be deposited appropriately.

The extremely tacky nature of caulking materials make it difficult to apply a uniform fillet or bead of such material by the unskilled, often resulting in smearing, gaps or other defects. Additionally, the long curing time results in accumulation of dirt, dust, and other particles and leaves the uncured caulk susceptible to damage caused by inadvertent subsequent contact. A need exists for a caulk which can be neatly applied, especially by the unskilled, and which on application leaves a caulk fillet or bead with a tack free surface.

U.S. Pat. No. 3,556,926 (Rundle) discloses the preparation of a caulking tape which attempts to meet this need by heating an oil-wax and polymer mixture and rapidly cooling one surface of the tape to cause such surface to be less tacky, but the resultant tacky surface of the composition would not be as effective a caulk as conventional rubber-based caulking materials because of the wax content which would make it less adherent.

A commercial product comprising a tacky caulk fillet or bead adherently bonded to the surface of a dimensionalized (e.g., by biaxial orientation and heat setting) polyester film is available under the trade designation "Press-n-Seal" from Consumer Products Management Group, Inc. of P.O. Box 12886 Shawnee Mission, Kans. Such a product is difficult to make because it requires deposition of the caulk fillet on a ribbon of the film, making placement of the fillet with respect to the film side edges difficult to control, necessitating the leaving of a large exposed film edge on each side of the fillet. It has been observed that an exposed film edge in excess of about 0.5 mm will cause water entry by capillary action once such a film-backed caulk is applied. The water would carry with it materials which support the growth of mold and mildew, thus creating the problem of cleaning behind the caulk. Depositing spaced caulk fillets on a film before slitting into ribbons provides a more practical production method, but it is very difficult to accomplish because the caulk tends to ball up on the slitting knife edges, again necessitating leaving a large exposed film edge. The fact that a large exposed film edge is a necessary consequence of such laminating processes is confirmed in the afore-mentioned "Press-n-Seal" product which has an exposed film edge on the average of about 2-3 mm. Additionally, since the films are usually dimensionalized, typically by orientation and heat setting, the film ribbon is not sufficiently conformable so that it can be stretched, necked down, or shaped around corners and edges, without later buckling.

SUMMARY OF THE INVENTION

The present invention provides an extruded caulking strip which is simple to apply to seal cracks or seams to provide an aesthetic appearance. The extruded caulk strip of the present invention comprises a substantially amorphous, non-tacky, conformable, elongate protective strip and a self-supporting, elongated, deformable, continuous, tacky caulk body. The protective strip has opposed major surfaces and opposed side edges and is formed of thermoplastic, film-forming polymeric material. The caulk body is in melt fusion contact with one major surface of the protective strip. The caulk body extends the entire length of the protective strip and has side edges within the side edges of the protective strip, with no more than about 1 mm, preferably 0.5 mm, most preferably 0.2 mm of the strip surface being exposed on either side of the caulk body. The preferred caulk body has a transverse cross section which is a trapezoid.

The term "amorphous" as herein used refers to the fact that the extruded thermoplastic material forming the protective strip according to the invention has a relatively low amount of crystallinity, making it much more conformable and ductile. By contrast, dimensionalized polymeric film, such as biaxially oriented, heat-set polyethylene terephthalate, is highly crystalline and not so conformable or ductile.

The caulk strip of the present invention is made by a method which comprises the steps of (a) melt extruding a thermoplastic film-forming polymeric material from a first extrusion orifice to form a continuous plastic strip which on cooling forms a substantially amorphous, non-tacky, elongate strip having opposed major surfaces and opposed side edges;

(b) melt extruding a caulk mass from a second extrusion orifice to form a shaped continuous plastic body which on cooling forms a self-supporting, deformable and tacky caulk body; p0 (c) contacting one of the major surfaces of the plastic strip of (a) with the plastic body of (b) while the contacting surfaces of the strip and the body are in a plastic state capable of self fusion on contact; and (d) cooling the resultant caulk strip.

The process described above involves coextrusion, i.e., the forming of a composite article of thermoplastic material by simultaneously extruding each constituent element of the composite structure through a separate extrusion opening so that the extruded parts meet while in a semi-molten or plastic tacky state sufficient to cause intermingling of the constituents at the interface whereby they become firmly united on cooling. Such a process, although known for the production of laminated films, has not been known for use in producing caulk strips of the type herein described.

It is quite unexpected that the article of the present invention could be produced because the polymeric material forming the protective strip of the extruded caulk strip has vastly different thermoplastic properties than those of the caulking material. The caulking material typically cannot be heated much beyond about 100° C. in order to maintain its structural integrity and shape. Suitable thermoplastic materials which are candidates for the protective strip are extrudable only at much higher temperatures, typically in excess of about 160° C., leading one to believe that such a composite caulk strip could not be made by coextrusion.

Quite surprisingly, it has been found that, in spite of the wide difference in thermoplastic properties, these materials can be coextruded to form an integral coextruded caulking strip.

BRIEF DESCRIPTION OF THE DRAWINGS

FIG. 4 is a perspective view of apparatus for simultaneously forming several extruded caulk strips in accordance with the present invention;

FIG. 5 is a cross sectional view taken along line 5—5 of FIG. 4 of caulk strips made using the apparatus depicted in FIG. 4;

DESCRIPTION OF THE PREFERRED EMBODIMENTS

Figure 1:
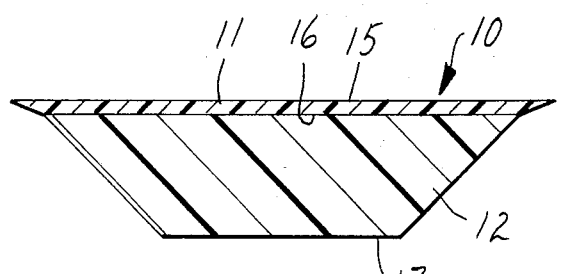
FIG. 1 is a cross section view of one embodiment of the extruded caulk strip of the invention.
Figure 2:
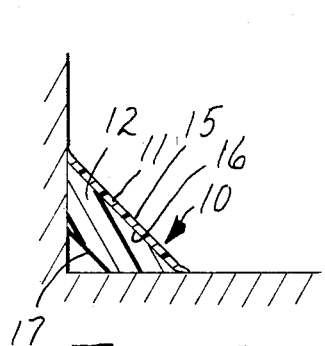
FIG. 2 is a cross sectional view of joined structural members with the caulk of FIG. 1 covering the joint therebetween.
Figure 3:
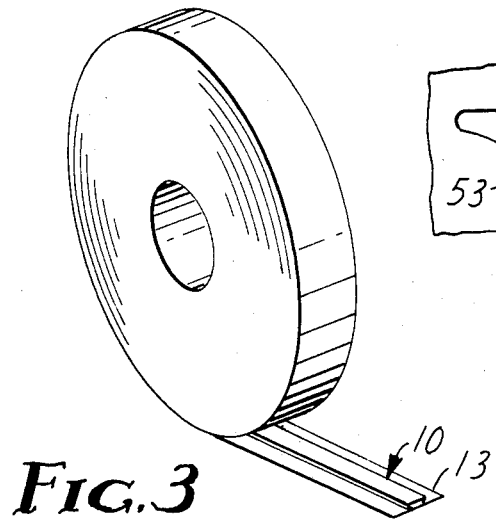
FIG. 3 is a perspective view of a roll formed of the caulk strip depicted in FIG. 1 carried on a release liner.

Referring now to FIGS. 1 and 3 there is shown an extruded caulk strip 10 having a protective strip 11 and a caulk body 12. Caulk 10 is conveniently carried on a release liner 13 which has sufficient adhesion for the surface of caulk body 12 and, on its backside, preferably a modest degree of frictional engagement with the exposed surface 15 of protective strip 11 so that a roll of strip 10 on a release liner 13 will not uncoil as the side of the roll is held parallel to the ground by its outer edge. A preferred release liner having these properties is formed of a polyethylene-paper-polyethylene laminate with one polyethylene surface coated with a silicone release material. A commercial embodiment of this material is available from Akrosil Division of Thilmay Paper Corp., Menasha, Wis.

Figure 6:
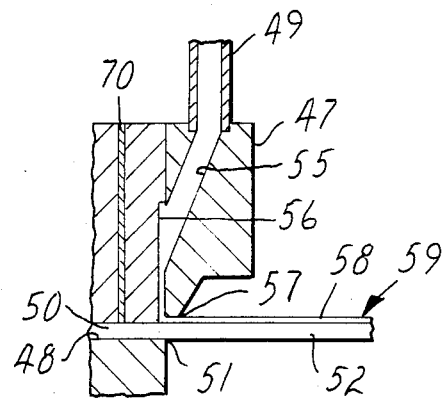
FIG. 6 is a cross sectional view of the extruder die of the apparatus shown in FIG. 4 utilized to prepare a coextruded caulk strip in accordance with the present invention.

The extruded caulk strip of the present invention is conveniently prepared by utilizing apparatus 40 as depicted in FIG. 4. Apparatus 40 includes two conventional extruders 41 and 42, each of which has a hopper 43 and 44, respectively, for receiving polymer, typically in the form of chips and pellets, and a housing 45 and 46, respectively, each of which includes a heating and mixing chamber for converting solid thermoplastic material into a plastic extrudable form and a means for pumping the plastic extrudable material to an extrusion die 47. Extrusion die 47 is shown in more detail in FIG. 6 as having a channel 48 for the passage of plastic extrudable material from extruder 42. A stream 50 of plastic extrudable material from extruder 41 passes from extrusion orifice 51 to form shaped caulk body 52. Preferably the part of the extrusion die block which permits the passage and shaping of the material forming the protective strip is thermally isolated from the part of the extrusion die block which permits the passage and shaping of the caulk mass. Such thermal isolation may be accomplished by the placement therebetween of a non-heat-conductive barrier 70, e.g., formed of ceramic material, glass fibers or the like.

Figure 7:
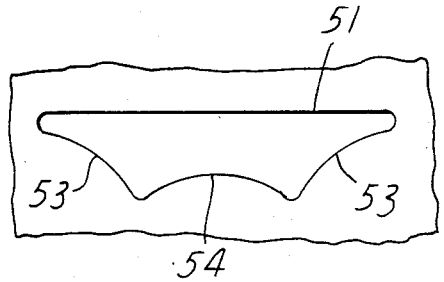
FIG. 7 is a fragmentary view of that part of the extruder die utilized to form the caulk body of the caulk strip depicted in FIG. 1.

Extrusion opening 51 is shown in greater detail in FIG. 7 as having inwardly curving side dimensions 53 and inwardly curving bottom dimensions 54 rather than straight dimensions as would be expected in the formation of a trapazoidal shape from an extruded mass. The inwardly curving dimensions are required because of the viscoelastic properties of the caulk extrudate. The viscosity of the extruded caulk is such that it causes "die swell", i.e., expansion as it exits the die, thereby distorting its side dimensions. The die opening of the type depicted in FIG. 7 is therefor necessary to achieve a desired trapazoidal shape.

The plastic material pumped from extruder 42 passes through conduit 49 through connecting passages 55 and 56 and out of slit-like opening 57 to form a strip 58 which merges with shaped caulk body 52 while the two are sufficiently tacky and adherent to form a self-fusion bond therebetween. Simultaneous extrusion of several extrudates may be accomplished as shown in FIG. 4 which reveals the simultaneous extrusion of four extrudates, as further depicted in cross section in FIG. 5.

Release liner 13 from storage roll 61 is fed onto belt 62 which is carried on idler rolls 63 and 64 to receive composite extrudate 59 which is then cooled, either by utilizing a cooling station 66 which impinges an air blast on extrudate strips 10 or by merely having a sufficient length to permit cooling between the extrusion die and a take up roll 67 for caulk strip 10.

The cross-sectional shape of caulk body 12 can take any variety of forms, the preferred being trapazoidal as shown. Other suitable forms include cross sections which are rectangular (e.g., square), hemispherical, triangular, and the like. Additionally, face 17 of strip 10 opposite protective strip 11 need not be flat or outwardly curving, but it could also be indented or otherwise shaped. The cross sectional dimensions may very, according to the particular utility contemplated. That is, where larger gaps are to be sealed, the dimensions would be correspondingly larger. For typical use, for example around a bath tub, shower stall or sink, the preferred dimensions are in the range of 1 to 5 mm in thickness and from 5 to 20 mm in average width, i.e., the dimension midway between the two parallel sides of the trapazoid.

The protective strip preferably is relatively thin, e.g., on the order of about 0.1 to about 1 mm, when compared to the thickness of a caulk body. The protective strip preferably has a flat exposed surface 15 and a flat surface 16 which interfaces with the surface of caulk body 12, although surface 16 may take any shape so long as the material forming protective strip 11 does not interfere with the performance of the caulk.

The material forming caulk body 12 can be any conventional caulking compound which is extrudable and which will maintain conventional caulking properties after melt extrusion as described above. The preferred caulking materials are those having a rubbery base, i.e., include a substantial portion of rubber such as butyl, polysulfide, polychloroprene, room temperature vulcanizable (RTV) silicone or acrylic rubber. Such rubbery materials may be in the latex form. Such caulking materials are typically compounded to a putty-like consistency with fillers such as calcium carbonate, zinc oxide, silica, tackifiers such as polybutene oils or terpene resins, plasticizers such as polybutene oils, thixotropes such as clays or colloidal silicas, and antioxidants. Other typical compounding ingredients may also be included.

A preferred useful caulking compound which hardens by solvent evaporation is as follows:

| Composition | Parts by weight |
|---|---|
| butyl rubber | 175 |
| mineral spirits | 270 |
| petroleum resins | 34 |
| pentaerythritol esters of rosin | 8 |
| bentone clay derivative | 23 |
| finely divided silica | 364 |
| fiber | 91 |
| titanium dioxide | 45 |

A preferred caulking composition is composed of emulsions and solutions of poly(methylmethacrylate) or its copolymers.

A typical useful caulking composition based upon acrylic latex is as follows:

| Composition | Parts by weight |
|---|---|
| acrylic latex (50% by wt. solids) | 41.9 |
| wetting agent | 1.7 |
| plasticizer | 9.5 |
| ethylene glycol | 32.0 |
| calcined China clay | 42.7 |
| titanium dioxide | 1.7 |
| mineral spirits | 0.3 |

Commercially available caulking compositions are useful in the practive of this invention.

The material forming the protective strip can be any thermoplastic film-forming polymeric material which, on extrusion and cooling, forms a substantially amorphous, non-tacky conformable strip. Preferred film-forming polymeric materials include thermoplastic polyurethanes, polyolefins (e.g., polyethylene, polypropylene, etc.), polyvinyl resins and the like. The preferred film-forming polymeric material is a thermoplastic polyurethane. The film-forming material may include additives normally found in plastics which are used in such situations such as, for example, antimicrobial agents, UV stabilizers, coloring agents, agents to modify the surface texture, and the like.

EXAMPLES

The invention is further illustrated by the following examples, in which all parts are by weight unless otherwise specified.

| Caulking Compound A | |
|---|---|
| Ingredient | Parts |
| partially crosslinked butyl rubber available under the trade designation "Bucar" 5214 | 17.9 |
| polybutylene oil available from the Chevron Corp. under the trade designation "Oronite" 128 | 19.7 |
| calcium carbonate | 35.8 |
| zinc oxide | 1.8 |
| hydrogenated rosin ester available under the trade designation "Stabelite" ester 10 from the Hercules Corp. | 0.8 |
| fumed silica available under the trade designation "Aerosil" R-972 from Degusa Corp. | 1.8 |
| dixie clay | 16.1 |
| polybutylene oil available under the trade designation "Indolpol"-100 from the Amoco Chemical Corp. | 3.7 |
| rubber anti-oxidant available under the trade designation "Santowite Crystals" from Monsanto Co., St. Louis, Missouri | 0.4 |
| titanium dioxide | 1.9 |

| Caulking Compound B | |
|---|---|
| Ingredient | Parts |
| low saturated, non-staining isoprene isobutylene copolymer rubber available under the trade designation "Polysar" 500 from Polysar Corp. | 17.6 |
| polybutylene oil ("Oronite" 128) | 19.7 |
| ground silica (No. 398) | 35.3 |
| zinc oxide | 1.8 |
| hydrogenated rosin ester "Stabelite" ester | 0.8 |
| fumed silica ("Aerosil" R-972) | 1.8 |
| coarse white clay available under the trade designation "Snowbrite" from Evans Clay Co. | 17.3 |
| polybutylene oil ("Indolpol" 100) | 3.7 |
| rubber anti-oxidant available under the trade designation "Santowite Crystals" from Monsanto Co., St. Louis, Missouri | 0.4 |
| titanium oxide | 1.9 |

| Protective Strip Composition | |
|---|---|
| Ingredient | Parts |
| thermoplastic aliphatic polyurethane available under the trade designation P-3429L from K. J. Quinn and | 95.4 |

-continued

| Protective Strip Composition | |
|---|---|
| Ingredient | Parts |
| Company of Maldon, Mass. | |
| 10,10'-oxybisphenoxarsine in a carrier resin to provide a anti-microbial agent available under the trade designation "Vinyzene" SB-1-PS from Morton Thiokol Inc. of Danvers, Mass. | 0.6 |
| color concentrate available under the trade designation C-PUR-1419 from Reed Plastics Corporation of Albion, Michigan | 4.0 |

EXAMPLE 1

The ingredients of caulking compound A were combined and mixed using a high shear mixer for a period of from 1½ to 4 hours and then formed into suitable billets for extrusion. The mixed compound, in the form of billets, was loaded into hopper 43 and fed into the extruder 41 maintained at a temperature of about 81° C. The thermoplastic film-forming polymeric material (in Protective Strip Composition) was fed in pellet form into hopper 44 and thence through extruder 42 with a temperature gradient from about 179° C. to an exit temperature of about 200° C. The two materials were extruded simultaneously onto a release liner 13 and thence passed into the cooling station 66. The thus formed extruded caulking strip, having an exposed edge of about 0.2 mm, was then wound convolutely into rolls. The resultant caulking strip performed well as a bathroom caulk, but tended to disintegrate on subsequent exposure to high acid cleaning materials.

EXAMPLE 2

The ingredients of caulking compound B were combined and mixed using a high shear mixer for a period of from 1½ to 4 hours and then formed into suitable billets for extrusion. The mixed compound, in the form of billets, was loaded into hopper 43 and fed into the extruder 41 maintained at a temperature of about 81° C. The thermoplastic film-forming polymeric material (in Protective Strip Composition) was fed in pellet form into hopper 44 and thence through extruder 42 with a temperature gradient from about 179° C. to an exit temperature of about 200° C. The two materials were extruded simultaneously onto a release liner 13 and thence passed into the cooling station 66. The thus formed extruded caulking strip, having an exposed edge of 0.2 mm, was then wound convolutely into rolls. The resultant caulk strip performed well as a bathroom caulk with no detrimental affect when exposed to acid type cleaning materials.

We claim:

1. Extruded caulk strip comprising
   an elongate strip having opposed major surfaces and opposed side edges formed of substantially amorphous, non-tacky, conformable, thermoplastic, film-forming polymeric material; and
   a self-supporting, elongated, deformable, continuous, tacky caulk body in melt fusion contact with one major surface of said strip, extending the entire length of said strip, and having side edges within said opposed side edges of said strip whereby no more than about 1 mm of said strip surface is exposed on either side of the caulk body.

2. The caulk strip of claim 1 wherein said caulk body has a transverse cross section which is a trapazoid having its wide parallel side in melt fusion contact with one major surface of said strip.

3. The caulk strip of claim 1 wherein said side edges of said strip extend up to 0.5 mm beyond the side edges of said caulk body.

4. The extruded caulk strip of claim 1 wherein said body is formed of caulk comprising rubber, filler, plasticizer, and tackifier.

5. The extruded caulk strip of claim 4 wherein said rubber is selected from a group consisting of butyl rubber, polysulfide rubber, polychloroprene rubber, and room temperature vulcanizable silicone rubber.

6. The extruded caulk strip of claim 4 wherein said rubber is in the form of a latex.

7. The extruded caulk strip of claim 4 wherein said filler is acid resistant.

8. Method of making a pre-formed caulk strip, said method comprising the steps of
   (a) melt extruding a thermoplastic film-forming polymeric material from a first extrusion orifice to form a continuous plastic strip which on cooling forms a substantially amorphous, non-tacky, elongate strip having opposed major surfaces and opposed side edges;
   (b) melt extruding a caulk mass from a second extrusion orifice to form a shaped continuous plastic body which on cooling forms a selfsupporting, deformable and tacky caulk body; and
   (c) contacting one of the major surfaces of the strip of (a) with the extruded caulk body of (b) while the contacting surfaces of the strip and the caulk body are in a plastic state capable of self fusion on contact, the caulk body extending the entire length of said strip and having side edges within the opposed side edges of the strip.

9. The method of claim 8 wherein said second extrusion orifice has a shape which extrudes a caulk body with a transverse cross section in the shape of a trapazoid.

10. The method of claim 8 wherein said first and said second extrusion orifices are in the same die block.

11. The method of claim 8 wherein said first and said second extrusion orifices are thermally isolated from one another.

* * * * *